United States Patent [19]
Kitajima et al.

[11] Patent Number: 5,010,283
[45] Date of Patent: Apr. 23, 1991

[54] MOTOR CONTROL CIRCUIT

[75] Inventors: Kimio Kitajima; Hiroyuki Kiuchi, both of Komagane, Japan

[73] Assignee: Sankyo Seiki Mfg. Co., Ltd., Tokyo, Japan

[21] Appl. No.: 464,354

[22] Filed: Jan. 12, 1990

[30] Foreign Application Priority Data

Jan. 13, 1988 [JP]  Japan .................................. 1-6471

[51] Int. Cl.$^5$ ............................................. H02P 3/10
[52] U.S. Cl. .................................... 318/373; 318/374; 318/254
[58] Field of Search ............... 318/138, 254, 256, 261, 318/264, 269, 272, 273, 275, 293, 370, 373, 374, 375, 376, 439

[56] References Cited

U.S. PATENT DOCUMENTS

| | | | |
|---|---|---|---|
| 3,895,277 | 7/1975 | Klumpp | 318/269 |
| 4,054,819 | 10/1977 | Johnson | 318/269 |
| 4,549,120 | 10/1985 | Banno et al. | 318/373 X |
| 4,629,949 | 12/1986 | Senso | 318/264 X |
| 4,742,282 | 5/1988 | Okutani et al. | 318/374 |
| 4,779,260 | 10/1988 | Kaneko et al. | 318/373 X |
| 4,833,378 | 5/1989 | Furue et al. | 318/374 |
| 4,864,211 | 9/1989 | Kawaguchi | 318/373 X |
| 4,926,101 | 5/1990 | Enomoto et al. | 318/293 X |

FOREIGN PATENT DOCUMENTS

| | | | |
|---|---|---|---|
| 56-157289 | 12/1981 | Japan | 318/375 |
| 57-3589 | 1/1982 | Japan | 318/375 |
| 2083304 | 3/1982 | United Kingdom | 318/269 |

*Primary Examiner*—Bentsu Ro
*Attorney, Agent, or Firm*—McCaulay Fisher Nissen Goldberg & Kiel

[57] ABSTRACT

A motor control circuit provides reduced stopping time. The circuit utilizes n rotational signals whose relative phase differences are proportional to the rotational speed of the motor. Inverted logic signals are formed of these n signals. Circuitry for discriminating the direction of the motor and for determining from the n signals n−1 and/or n inverted signals, the initial change of any of the signals following a reversal of the motor. Upon determining the initial change, a signal is supplied to the motor drive circuit to cause the motor to de-energized. A specific circuit for holding the motor in a stopped condition is disclosed.

12 Claims, 5 Drawing Sheets

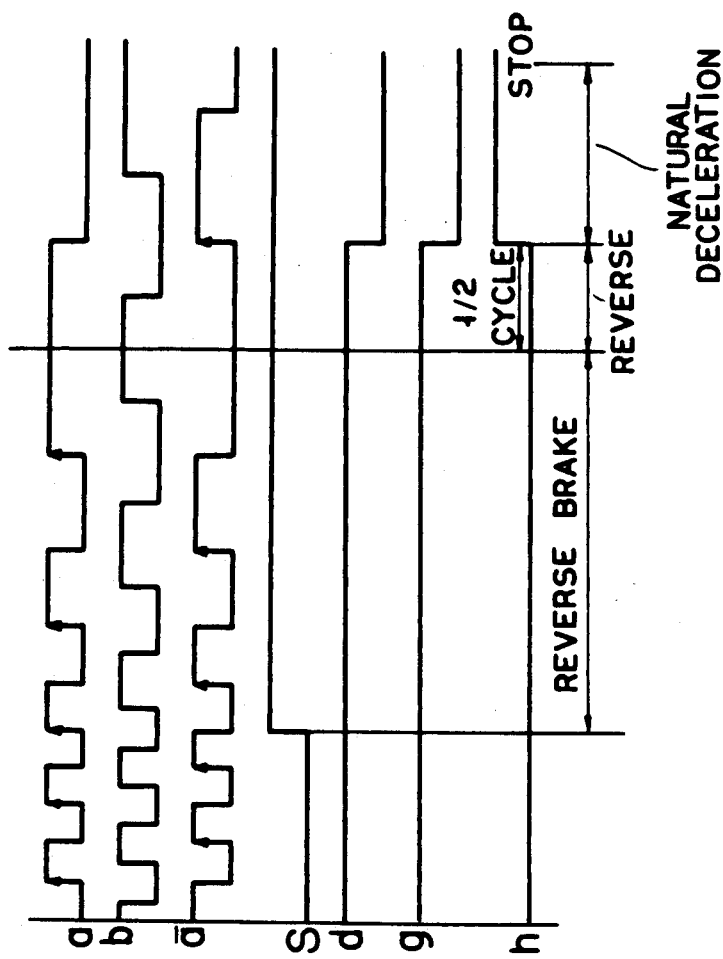
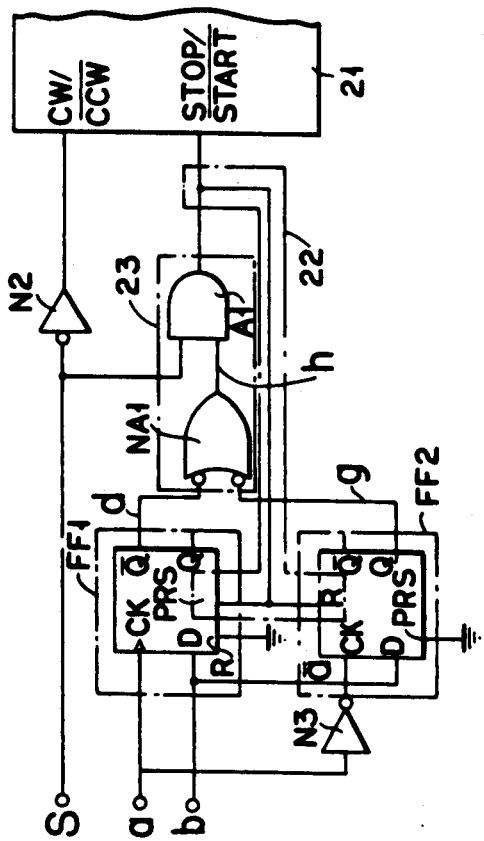
FIG. 1
FIG. 2

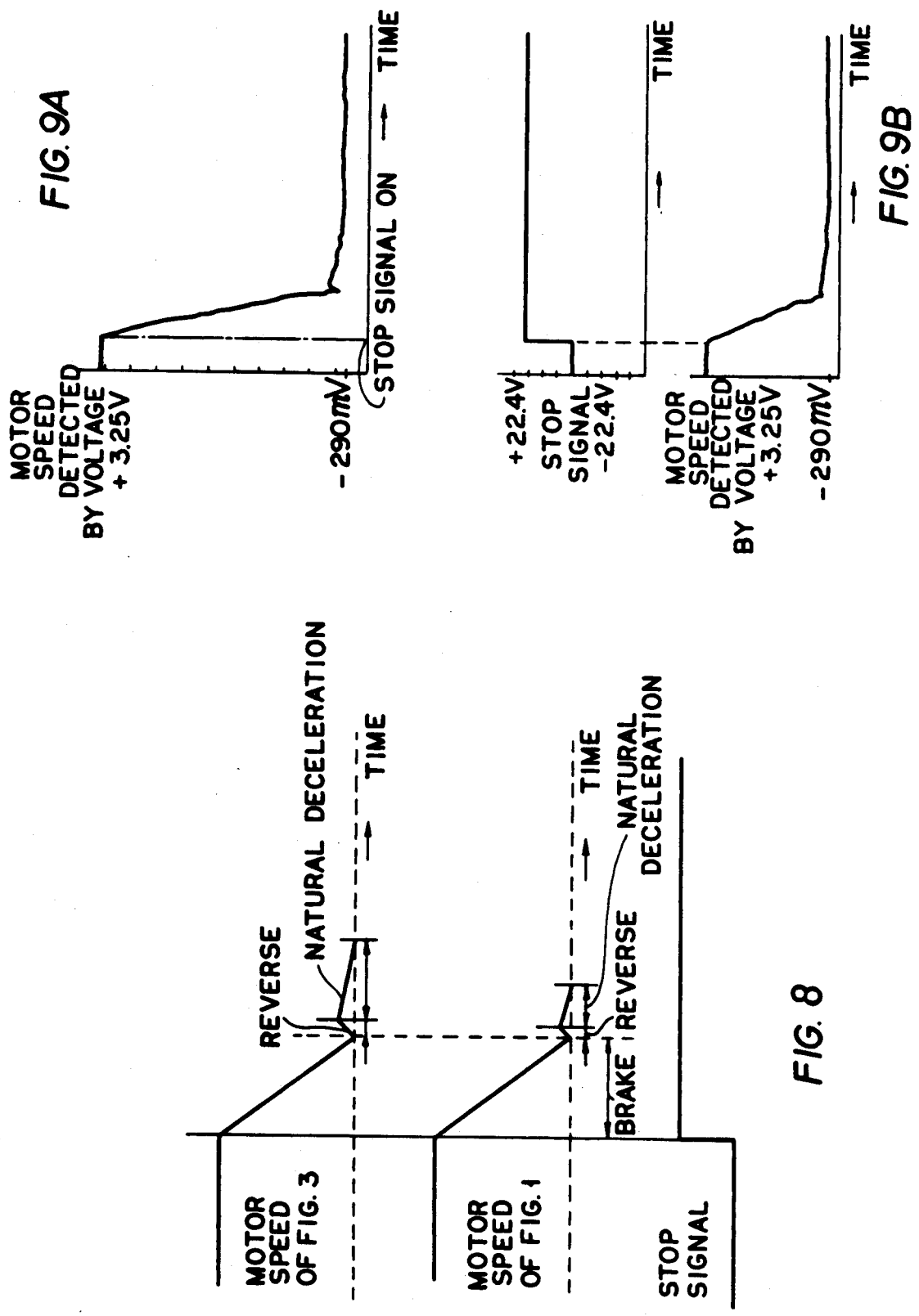

MOTOR CONTROL CIRCUIT

BACKGROUND OF THE INVENTION a) Field of the Invention

The present invention relates to motor control circuits and, more particularly, to such circuits for stopping motors which provide a reduced stopping time.

b) Background of the Prior Art

In a compact disk player or a photo disk device, it is desired to shorten the waiting time as much as possible before the disk can be removed.

For this purpose, a brake circuit is provided in a control circuit for a spindle motor which rotatively drives a disk in order to rapidly stop the rotation of the disk.

For use as such circuit, a logic type control circuit is known which applies energy to a motor so that it is rotated in a direction opposite to that in which the motor is initially rotated to apply a brake, and the start of the reverse rotation of the motor is detected to stop energization to the motor. This is disclosed in Japanese Utility Model Application LaidOpen No. 195392/1982 (See FIG. 3).

The logic control type circuit described in this publication comprises a discrimination circuit (5) for discriminating a rotational direction of a motor by rotational signals (c) and (d), which differ in phase proportional to the rotational speed of the motor based on the outputs of Hall elements H1 and H2, a memory (6) for storing the discrimination signal of the discrimination circuit, a rotational direction instruction circuit (10) for controlling a motor drive circuit (2) so that the motor is reversely rotated at the time of the stop instruction, a comparator circuit (7) for comparing the discrimination signal of the discrimination circuit (5) with the stored signal of the memory circuit, and a stop circuit (11) for opening a power source of the drive circuit (2) in response to the change in output of the comparator circuit when the motor is reversed.

In this circuit, the rotational direction of the motor is discriminated by the discrimination circuit (5) on the basis of the rotational signals (c) and (d) which differ in phase proportional to the rotational speed of the motor as derived from the rotation detector, and the discrimination signal of the discrimination circuit is stored in the memory circuit (6). The drive circuit (2) is capable of rotating the motor in both clockwise and counterclockwise directions, and at the time of the stop instruction, the motor drive circuit (2) is controlled so that the motor is energized in the direction opposite to the initial energizing direction by the rotational direction instruction circuit (10) to apply a brake in order to reverse the motor. The discrimination signal of the discrimination circuit (5) and the storage signal of the memory circuit (6) are compared by the comparator circuit and the power source of the drive circuit is opened by the stop circuit (11) due to the change in output of the comparator circuit (7) when the motor is reversed.

A D flip flop FF1 constitutes a discrimination circuit (5) in which rotational signals, i.e., clocks having outputs of a rotation detector shaped in waveform (c) and (d), which differ in phase proportional to the rotational speed of the motor as derived from Hall elements for detecting the rotation of the motor, are supplied so that the (d) signal is latched by a change in state (rise) of the (c) signal to thereby discriminate the rotational direction of the motor. The rotational direction instruction circuit (10) prepares a rotational direction signal (f) from a stop signal (stop instruction) (a) and a rotational direction instruction signal (b) to supply it to the motor drive circuit 2. The stop circuit (11) prepares an energization signal, stop-start signal (j), from a stop signal (a) and an output signal (e) of the D flip flop FF1 to feed it to the drive circuit 2. The drive circuit 2 controls the rotational direction of the motor to the normal positive rotational direction when the stop signal (a) is off (low level) and the rotational direction instruction (f) is at a high level, and controls the rotational direction of the motor to the rotational direction opposite the normal direction when the stop signal is on (high level) and the rotational direction instruction (f) is at a low level. That is, this drive circuit 2 determines the normal rotational direction (positive rotational direction) in either clockwise or counterclockwise direction to provide a logic arrangement such that only when the stop signal (a) is on, the motor is rotated in the rotational direction opposite to the normal rotational direction whereas when the stop signal (a) is off, the power source is opened. The drive circuit 2 energizes the motor when the stop signal (a) is off and the energized signal (j) is at a low level to drive the motor in the positive rotational direction. When the stop signal (a) is on as shown in FIG. 4, the rotational direction instruction (f) is at a low level so that the motor is reversely rotated by the drive circuit 2. When the motor is actually reversely rotated, the D flip flop FF1 detects its reversal, the output signal thereof assumes a high level and the energized signal (3) assumes a high level so that the energization to the motor is stopped by the drive circuit 21 and the motor naturally decelerates and stops. In this case, the reversal detection time until the D flip flop FF1 detects the reversal after the motor has been actually reversed changes since the start of reversal of the motor is not in synchronism with the rotational signals (c) and (d) from the rotation detector, but it is, at most, one period portion of the rotational signals.

The reversal of the motor upon application of the brake thereto is detected by comparing the discrimination signal of the discrimination circuit (5) with the storage signal of the memory circuit (6) by the comparator circuit (7). Accordingly, the time until the reversal of the motor is detected after the motor starts to reverse is the total of the time until the discrimination circuit detects the reversal of the motor and the time until the comparator circuit (7) detects the reversal of the motor by comparison of the discrimination signal of the discrimination circuit (5) with the storage signal of the memory circuit (6), which is a total time beyond one period of the rotational signal from the rotation detector. Therefore, the reversing time of the motor becomes extended and the stopping of the motor is delayed.

In the past, when a vibration occurs in the entire apparatus including a motor and as a result the rotor of the motor rotates, the motor sometimes continues to run due to the vibration despite a stop instruction having been issued since the time a rotational signal had been provided from the rotation detector.

The present invention overcomes the above-described disadvantages. It is an object of the present invention to provide a stop control circuit for a motor which is simple in structure and in which, in the case where braking is applied to the motor, reversal detection time until the reversal of the motor is detected after the motor begins to reverse can be considerably shortened, and the stopping of the motor can be performed quickly and positively.

SUMMARY OF THE PRESENT INVENTION

In accordance with the present invention, a motor control circuit for causing a motor to have a reduced stopping time comprises means for supplying n rotational signals whose relative phase differences are proportional to the rotational speed of a motor and are nominally related by 360°/n, means for forming n-1 inverted signals from said n rotational signals, a motor drive circuit, means for supplying a signal to stop the motor and rotational direction instruction means for controlling the motor drive circuit so that the motor is reversely rotated when a signal to stop the motor is supplied. Also included are means for discriminating the direction of the motor and for determining, from the n signals and n-1 inverted signals, the initial change of the n signals and n-1 inverted signals following a reversal of the motor and for supplying a signal to the motor drive circuit to de-energize the motor upon determining the initial change. An even shorter motor stopping time can be achieved when n inverted signals are formed from the n rotational signals and the initial change is determined from the n rotational signals and n inverted signals.

For a better understanding of the present invention, reference is made to the following description and accompanying drawings while the scope of the invention will be pointed out in the appended claims.

BRIEF DESCRIPTION OF THE DRAWINGS

In the drawings,

FIG. 1 is a block diagram showing one embodiment of the present invention;

FIG. 2 is a timing chart of the embodiment;

FIG. 8 is a view showing braking characteristics of each motor stop control circuit; and FIGS. 9(a) 9(b) are views showing actually measured data of the braking characteristics in the embodiment shown in FIG. 1.

DESCRIPTION OF THE PREFERRED EMBODIMENTS

Figure 3:
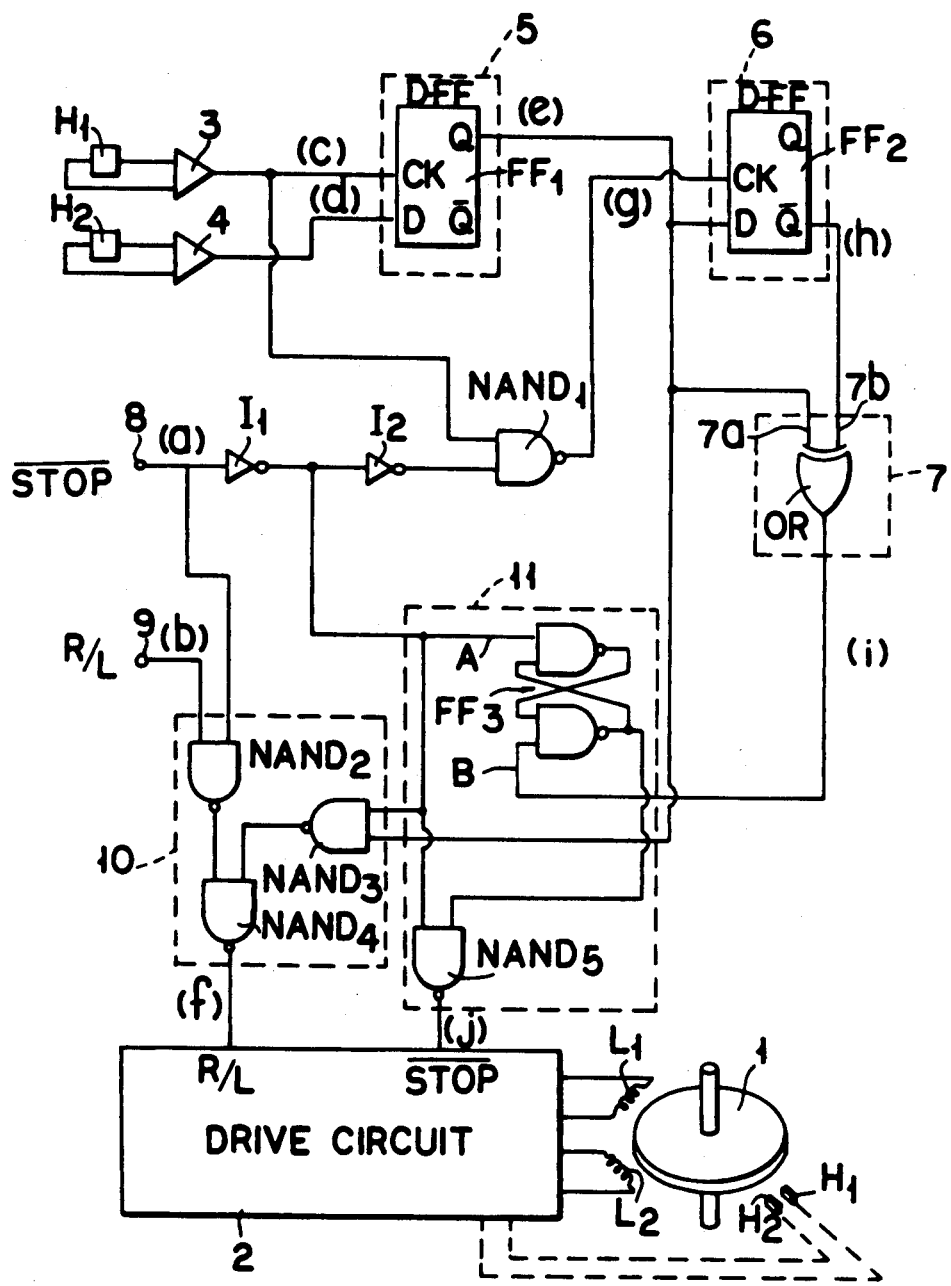
FIG. 3 a circuit arrangement showing a stop control circuit of a motor according to prior art.

Referring initially to FIGS. 1 and 2, FIG. 1 shows a first embodiment of the present invention, and FIG. 2 is a timing chart thereof.

The circuit of this embodiment comprises a second discrimination circuit FF2 composed of an inverter N3 and a D flip flop, a stop hold circuit 22 and a stop circuit 23.

A rotational signal a from a rotation detector is inverted by the inverter N3 to form an inverted logic signal $\bar{a}$, and the D flip flop FF2 latches a rotational signal b from the rotation detector because of a rise of the output signal $\bar{a}$ of the inverter N3 to thereby discriminate the rotational direction of the motor. In the stop circuit 23, the NAND operation of an inverted output signal d of a first discrimination circuit FF1 comprising a D flip flop and a non-inverted output signal g of a second discrimination circuit FF2 comprising a D flip flop is performed by a NAND circuit NA1. The AND operation of an output signal h of the NAND circuit NA1 and a stop signal s is performed by an AND circuit A1. An output signal of the AND circuit A1 is supplied to a drive circuit 21 as an energization signal (stop/start signal STOP/START). In the stop hold circuit 22, D flip flop FF2 is set by the output signal of the AND circuit A1 and D flip flop FF2 is reset.

When stop signal s is off and the energization signal from the AND circuit A1 is at a low level, the drive circuit 21 energizes the motor to drive the latter in the normal rotational direction. When the stop signal s is "on", as shown in FIG. 2, a rotational direction instruction from the inverter N2 assumes a low level, and the drive circuit 21 drives so as to reversely rotate the motor. When the motor is actually reversely rotated, D flip flops FF1 and FF2 discriminate the reversal of the motor, and output signals d and g assume a high level. The NAND circuit NA1 performs a NAND operation of output signals d and g of the D flip flops FF1 and FF2, and when the D flip flops FF1 and FF2 discriminate the reversal of the motor, the output signal h of the NAND circuit NA1 assumes a high level. In this case, the output signal h of the NAND circuit NA1 assumes a high level at the time when either D flip flops FF1 or FF2 first discriminates the reversal of the motor. When the output signal h of the NAND circuit NA1 assumes a high level, the energized signal from the AND circuit A1 assumes a high level so that the power source of the drive circuit 21 is opened for stopping the energization of the motor and, as a result, the motor naturally decelerates and stops. In the stop hold circuit 22, the D flip flop FF1 is set and the D flip flop FF2 is reset by the output signal of the AND circuit A1, and the stop of the motor is maintained. Accordingly, even if the vibration of the entire apparatus including the motor occurs and the rotor of the motor rotates, the motor stops immediately after the disappearance of the vibration, thus eliminating erroneous operation such as reversal, run-away or the like of the motor. The stop hold circuit 22 becomes inoperative if the energized signal from the AND circuit A1 is off. When the motor is energized, a stop signal is normally on (since a switch is set to the stop position), and therefore the motor stops.

In this embodiment, the reversal of the motor is discriminated by the D flip flops, FF1 FF2, at both edges (rise and fall) of the rotational signal a from the rotation detector and the stop circuit 23 is controlled by the discrimination signal of whichever one first discriminates the reversal. Therefore, as compared with the FIG. 3 circuit in which the reversal of the motor is discriminated by only the rising edge of the rotational signal a, the reversal detection time is ½ thereof, and the natural stop time of the motor is also shortened because the reversal detection time is ½. As a result, the stop time obtained by adding the natural stop time to the reversal detection time is shortened. FIGS. 9 (a) and (b) show actual measured data of brake characteristics in this embodiment.

Figure 5:
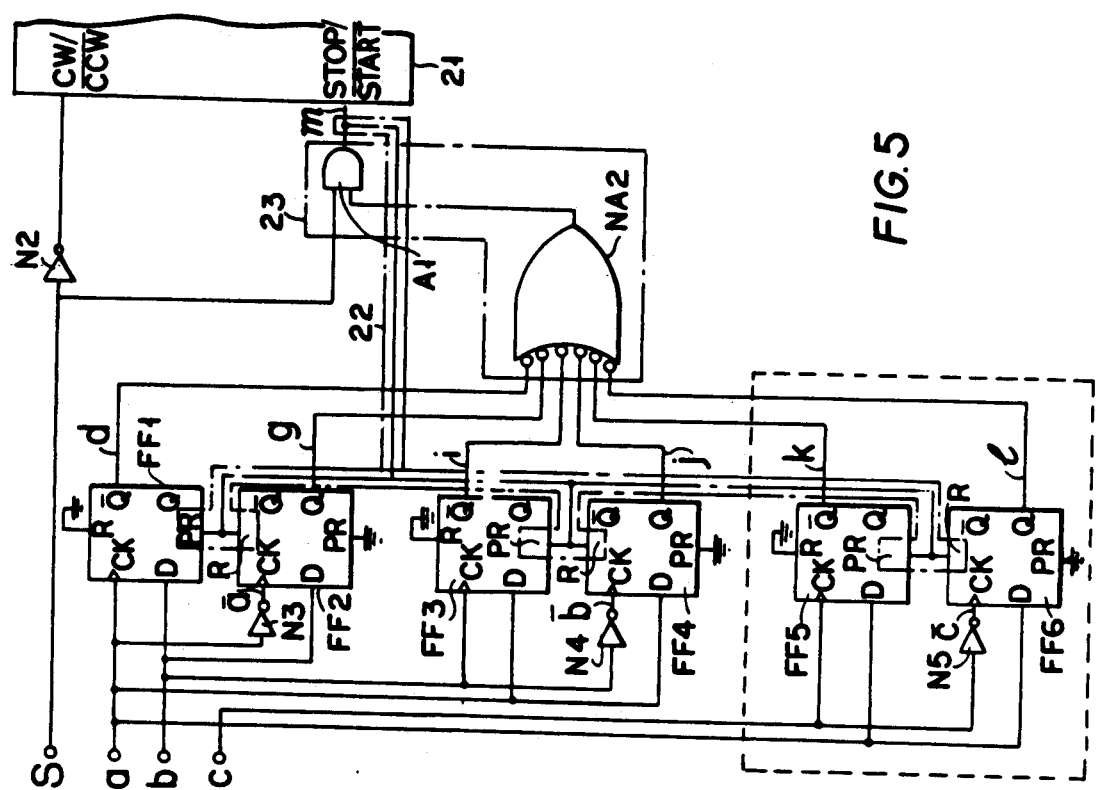
FIG. 5 is a block diagram showing another embodiment of the present invention.
Figure 4:
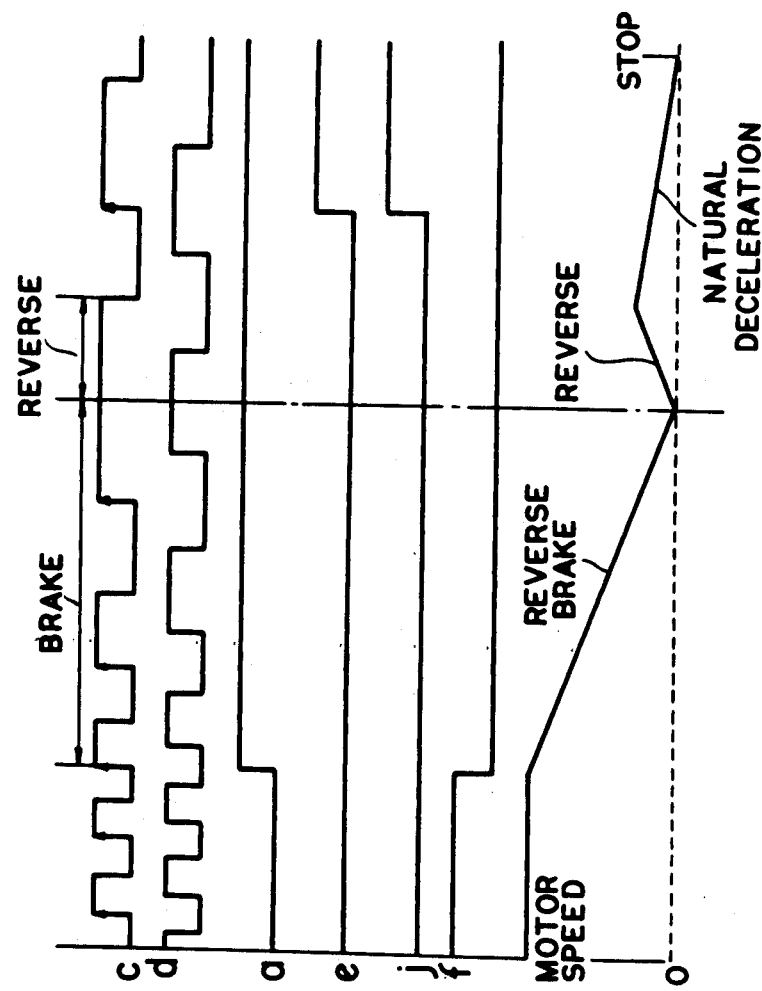
FIG. 4 is a timing chart of the stop control circuit of the prior art.

FIG. 5 shows another embodiment of the present invention.

In this embodiment, third to sixth discrimination circuits comprising third to sixth D flip flops, respectively, and inverters N4 and N5 are added to the previous embodiment. A 6-input NAND circuit NA2 is used as the NAND circuit in the stop circuit 23. In the stop hold circuit 22, D flip flops FF1, FF3 and FF5 are set and D flip flops FF2, FF4 and FF6 are reset. Three-phase rotational signals, clocks having an output of a rotation detector shaped in waveform a, b and c, which differ in phase proportional to the rotation speed of the motor, are supplied from a rotation detector such as a Hall element, a Hall IC, a magnetic resistor, etc. for detecting the rotation of the motor. In this embodiment, flip flops FF5 and FF6 (indicated by the dotted lines) may be omitted.

Figure 7:
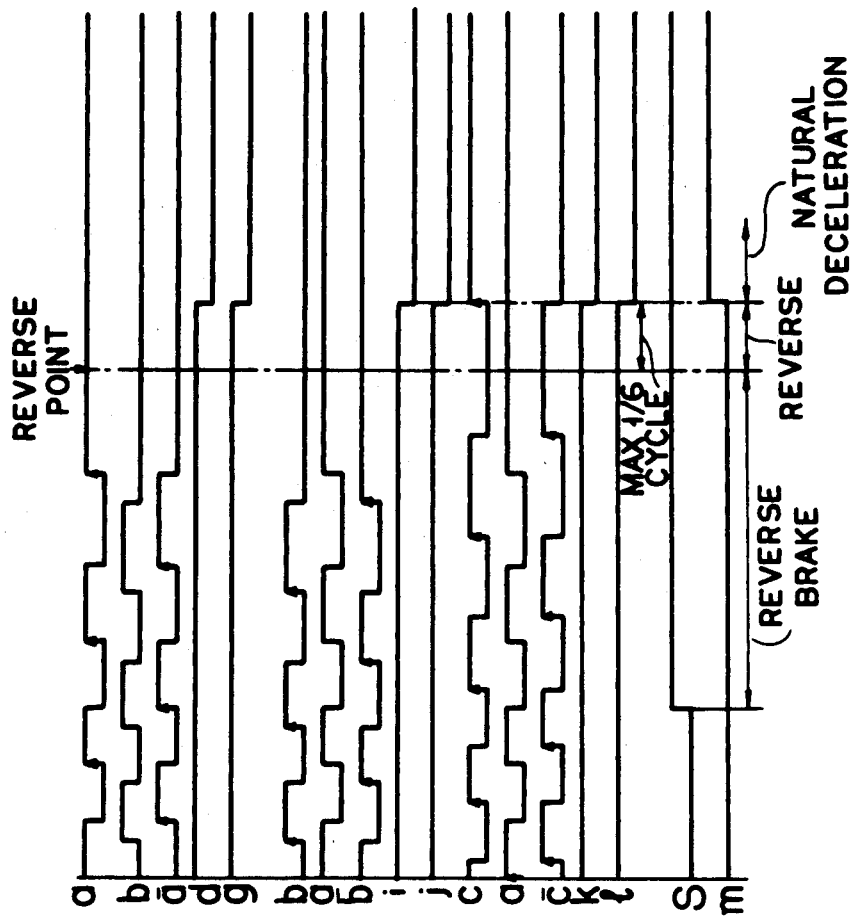
FIGS. 6 and 7 are timing charts in which a part of the embodiment is omitted and a timing chart of the embodiment, respectively.
Figure 6:
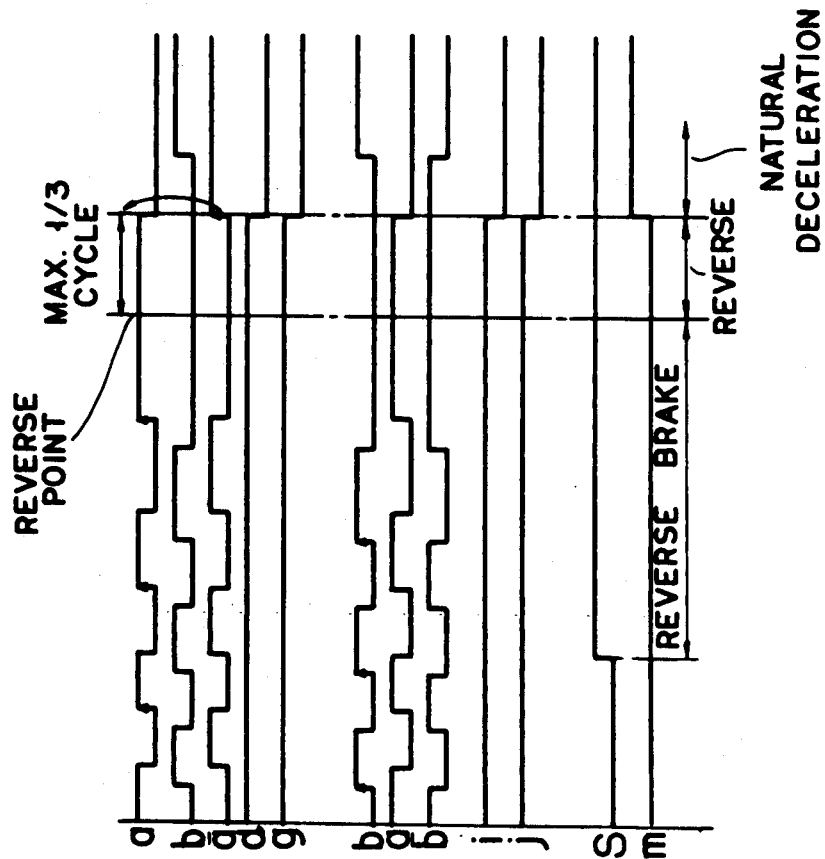

FIG. 6 shows a timing chart in the case where flip flops FF5 and FF6 are omitted in this embodiment. FIG. 7 shows a timing chart in the case where flip flops FF5 and FF6 are included. D flip flops FF1 and FF2 latch the rotational signal b at both edges of the rotational signal a to discriminate the reversal of the motor similarly to the previous embodiment. D flip flops FF3 and FF5 latch the rotational signal a at the respective rising edge of the rotational signals b and c to thereby discriminate the reversal of the motor. The rotational signals b and c are inverted by the inverters N4 and N5 into inverted logic signals, and the D flip flops FF4 and FF6 latch the rotational signals a at the rising portions of the output signals b and c, respectively, of the inverters N4 and N5 to thereby discriminate the reversal of the motor. The NAND circuit NA2 performs NAND operations of inverted output signals d, i, k of the D flip flops FF1, FF3 and FF5, and non-inverted output signals g, j and 1 of the D flip-flops FF2, FF4 and FF6, respectively, and the output signals are supplied to the AND circuit A1. Accordingly, the stop circuit 23 turns on an energization signal m to the drive circuit 21 from the time of discrimination by the discrimination signal from the D flip flops FF1 to FF6 which first discriminates the reversal of the motor to stop the drive of the motor.

In the case where flip flops FF5 and FF6 are omitted, the rotational signal a and b have a phase difference of 120°, and the reversal of the motor is discriminated by D flip flops FF1 to FF4 at the rise and fall of the rotational signal a and the rise and fall of the rotational signal b, and therefore, the resolution thereof is higher than that of the previous FIG. 1 embodiment. The stop circuit 23 is controlled by the discrimination signal from the D flip flops FF1 to FF4 which first discriminates the reversal of the motor and, therefore, the reversal detection time is ⅓ of the period portion of the rotational signal at the maximum, which is ⅓ of that of the prior art.

In the case where flip flops FF5 and FF6 are included, the reversal of the motor is discriminated by the D flip flops FF1 to FF6 at the rise and fall of the rotational signal, the rise and fall of the rotational signal b and the rise and fall of the rotational signal c, and therefore, the resolution thereof becomes even greater. Since the stop circuit 23 is controlled by the discrimination signal from the D flip flops FF1 to FF6 which first discriminates the reversal of the motor, the reversal detection time is 1/6 of the period portion of the rotational signal at the maximum, which is 1/6 of that prior art.

As may be understood from FIG. 8, the stop time of the motor refers to the time from the commencement of the ON portion of the stop signal to the stop of the motor, which is obtained by adding the sum of the braking time at which the motor is braked and the reversal time at which the motor is reversed (reversal detection time) to the natural stop time until the motor naturally stops from the termination of energization. The braking time is constant due to the logic circuit in the abovedescribed embodiment, the reversal detection time can be shortened to ⅓, ⅓, 1/6 (or even less) of the prior art circuit as mentioned above. The shorter the reversal detection time, the shorter the natural stop time. That is, the natural stop time becomes shortened proportional to the reversal detection time. As a result, the braking time from the stop time is constant due to the logic circuit, and if the reversal detection is shortened, the natural stop time can be also shortened.

The effect of shortening of the time is considerable. The present invention has been accomplished by particularly focusing on the above point. In the above-described embodiment, the reversal detection time can be shortened to shorten the stop time.

In the FIG. 5 embodiment, in the case where flip flops F5 and F6 are included, the reversal of the motor is discriminated by the D flip flops FF1 to FF6 at the rise and fall of the rotational signal a, the rise and fall of the rotational signal b and the rise and fall of the rotational signal c, and the stop circuit 23 is controlled by whichever discrimination signal first discriminates the reversal of the motor. However, it is possible to provide twelve discrimination circuits comprising two discrimination circuits for latching the rotational signal b at the rise and fall of the rotational signal a, two discrimination circuits for latching a negative logic signal of the rotational signal b at the rise and fall of the rotational signal a, two discrimination circuits for latching the rotational signal c at the rise and fall of the rotational signal a, two discrimination circuits for latching a negative logic signal of the rotational signal c at the rise and fall of the rotational signal a, two discrimination circuits for latching the rotational signal c and a negative logic signal thereof at the rise of the rotational signal b, and two discrimination signals for latching the rotational signal c and a negative logic signal thereof at the rise of the negative logic signal of the rotational signal b. In this case, the reversal detection time is not 1/12 but 1/6. While this construction does not further reduce the stopping time of the motor, it will offer an improved motor control stability.

As described above, according to the present invention, since there is provided a stop circuit which detects that a rotational signal is first changed after the motor has been reversed to open a power source of the drive circuit, the circuit structure is simple, the reversal detection time can be considerably shortened and the stopping of the motor can be rapidly carried out.

Furthermore, since there is provided a stop hold circuit which resets each of the discrimination circuit by the stop signal of the stop circuit to maintain the stop of the motor, erroneous functions, such as reversal and runaway of the motor, can be eliminated.

While the foregoing description and drawings represent the preferred embodiments of the present invention, it will be obvious to those skilled in the art that various changes and modifications may be made therein without departing from the true spirit and scope of the present invention.

What is claimed is:

1. A motor control circuit for causing a motor to have a reduced stopping time comprising:
   means for supplying first and second rotational signals whose phase difference is proportional to the rotational speed of said motor;
   means for forming an inverted signal of said first rotational signal;

means for supplying a signal to stop the motor;

a first discrimination circuit for discriminating a rotational direction of the motor in response to said first and second rotational signals and for providing an output signal representative thereof;

a second discrimination circuit for discriminating the rotational direction of the motor in response to said inverted signal and said second rotational signal for providing an output signal representative thereof;

a motor drive circuit;

rotational direction instruction means for controlling said motor drive circuit so that said motor is reversely rotated when said signal to stop said motor is supplied;

a stop circuit for supplying a signal to said motor drive circuit to de-energize said motor, said stop circuit responsive to the output signals from said first and second discrimination circuits, which circuits, after said motor has been rotated reversely, detect a predetermined initial change of said first rotational signal and said inverted signal; and a hold circuit for resetting said first and second discrimination circuits by a stop signal provided by said stop circuit for holding the stopped state of the motor.

2. The motor control circuit as in claim 1 wherein said initial change is an initial rise in said first rotating signal and said inverted signal.

3. A motor control circuit for causing a motor to have a reduce stopping time comprising:

means for supplying n rotational signals whose relative phase differences are proportional to the rotational speed of a motor and are nominally related by 360°/n;

means for forming inverted signals from n-1 of said rotational signals;

a motor drive circuit;

means for supplying a signal to stop the motor;

rotational direction instruction means for controlling said motor drive circuit so that said motor is reversely rotated when said signal to stop said motor is supplied;

means for discriminating the direction of said motor and for determining, from said n signals and from said n-1 inverted signals, a predetermined initial flange of said n signals and n-1 inverted signals following a reversal of said motor and for supplying a signal to said motor drive circuit to de-energize said motor upon determining said initial change; and means for holding said motor in a stopped condition following stopping of said motor.

4. The motor control circuit of claim 3 wherein n=2.

5. The motor control circuit of claim 3 wherein n=3.

6. The motor control circuit of claim 3 wherein n inverted signals are formed from said n rotational signals and wherein the initial change is determined by said discriminating means from said n signals and said n inverted signals.

7. The motor control circuit of claim 6 wherein said discriminating means includes n pairs of discrimination circuits, each pair having a first discriminating circuit for discriminating a rotational direction of said motor in response to a specific one of said n rotational signals and for providing an output signal representative thereof and a second discriminating circuit for discriminating the rotational direction of the motor in response to an inverted logic signal of said specific one of said n rotational signals; each such pair also being responsive to a specific other one of said n rotational signals; each said specific signal and said inverted logic signal of said specific signal being associated with a unique pair of discrimination circuits.

8. A method for reducing the time for a motor to come to a complete stop comprising:

supplying a plurality of n rotational signals related to the rotational speed of a motor by the relative phase difference therebetween, the signals nominally being related by 360°/n;

forming n-1 inverted signals from said n rotational signals;

reversing the rotational direction of said motor in response to a signal to stop the motor;

determining, from said n signals and n-1 inverted signals, a predetermined initial change of any of said n rotational signals and n-1 inverted signals following a reversal of said motor;

de-energizing said motor upon determining said initial change; and positively holding the motor in a stopped state after said motor has come to a complete stop.

9. The method of claim 8 wherein n=2.

10. The method of claim 8 wherein n=3.

11. The method of claim 8 wherein said n signals are pulse-type signals, said inverted signals are inverted logic signals and said initial change is an initial rise in said signal.

12. The method of claim 8 wherein said forming step forms n inverted signals from said n rotational signals and the determining step determines the initial change from the n rotational signals and n inverted signals.

* * * * *

UNITED STATES PATENT AND TRADEMARK OFFICE
CERTIFICATE OF CORRECTION

PATENT NO. : 5,010,283

DATED : April 23, 1991

INVENTOR(S) : Kimio Kitajima, et. al.

It is certified that error appears in the above-identified patent and that said Letters Patent is hereby corrected as shown below:

On the Title page, item [73], Assignee: change from "Tokyo" to "Nagano"

Column 2, line 31, change from "(3)" to "(j)"

Column 5, line 28, change from "l" to "1"

Column 7 Claim 3, line 31, change from "reduce" to "reduced"

Column 7, Claim 3, line 48, change from "flange" to "change"

Signed and Sealed this

Ninth Day of November, 1993

Attest:

BRUCE LEHMAN

*Attesting Officer*   *Commissioner of Patents and Trademarks*